April 15, 1958 L. A. POSEY 2,830,717
BOAT TRAILER
Filed March 19, 1956 3 Sheets-Sheet 2
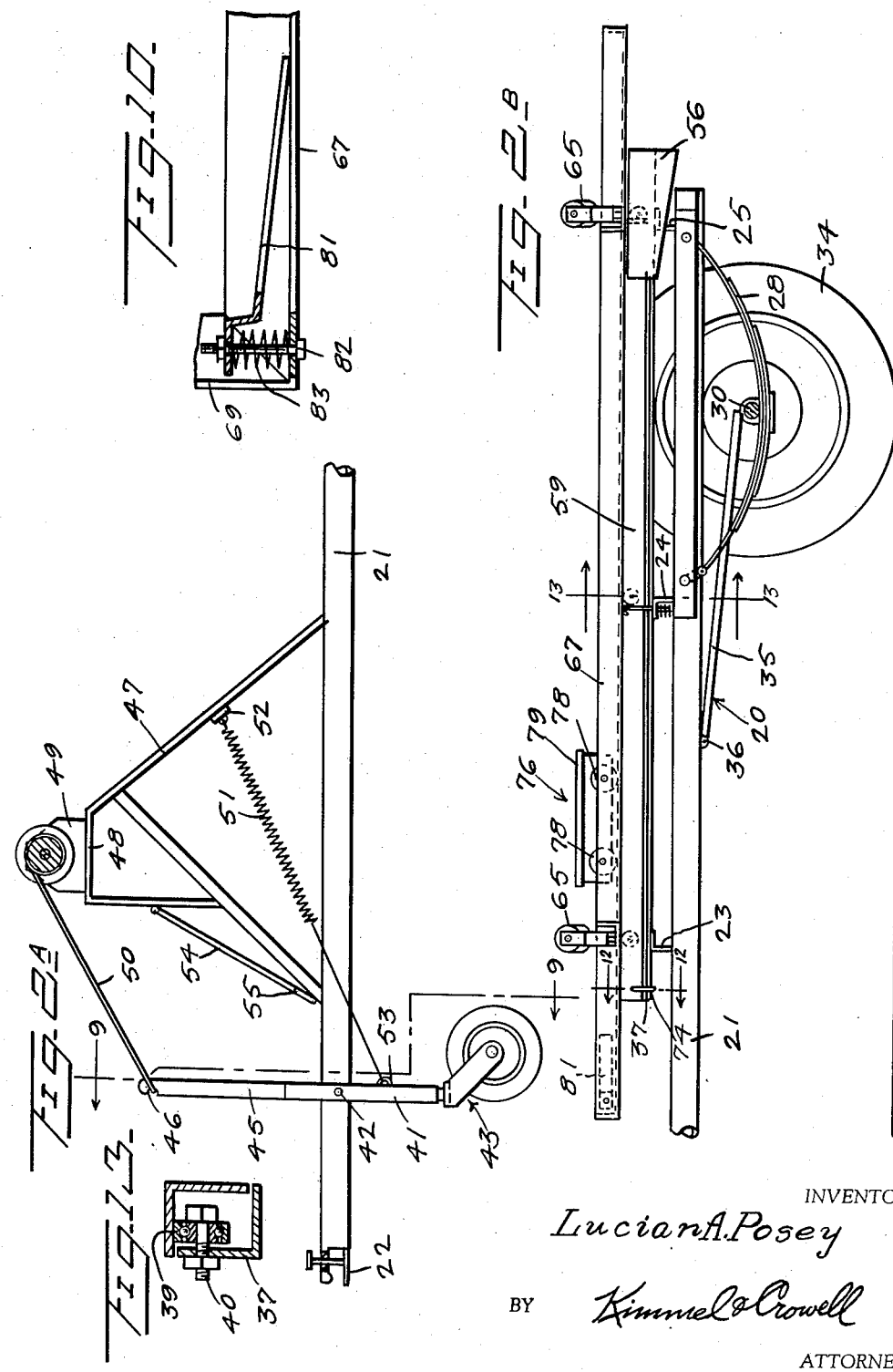
INVENTOR
Lucian A. Posey
BY Kimmel & Crowell
ATTORNEYS April 15, 1958     L. A. POSEY     2,830,717
BOAT TRAILER
Filed March 19, 1956     3 Sheets-Sheet 3
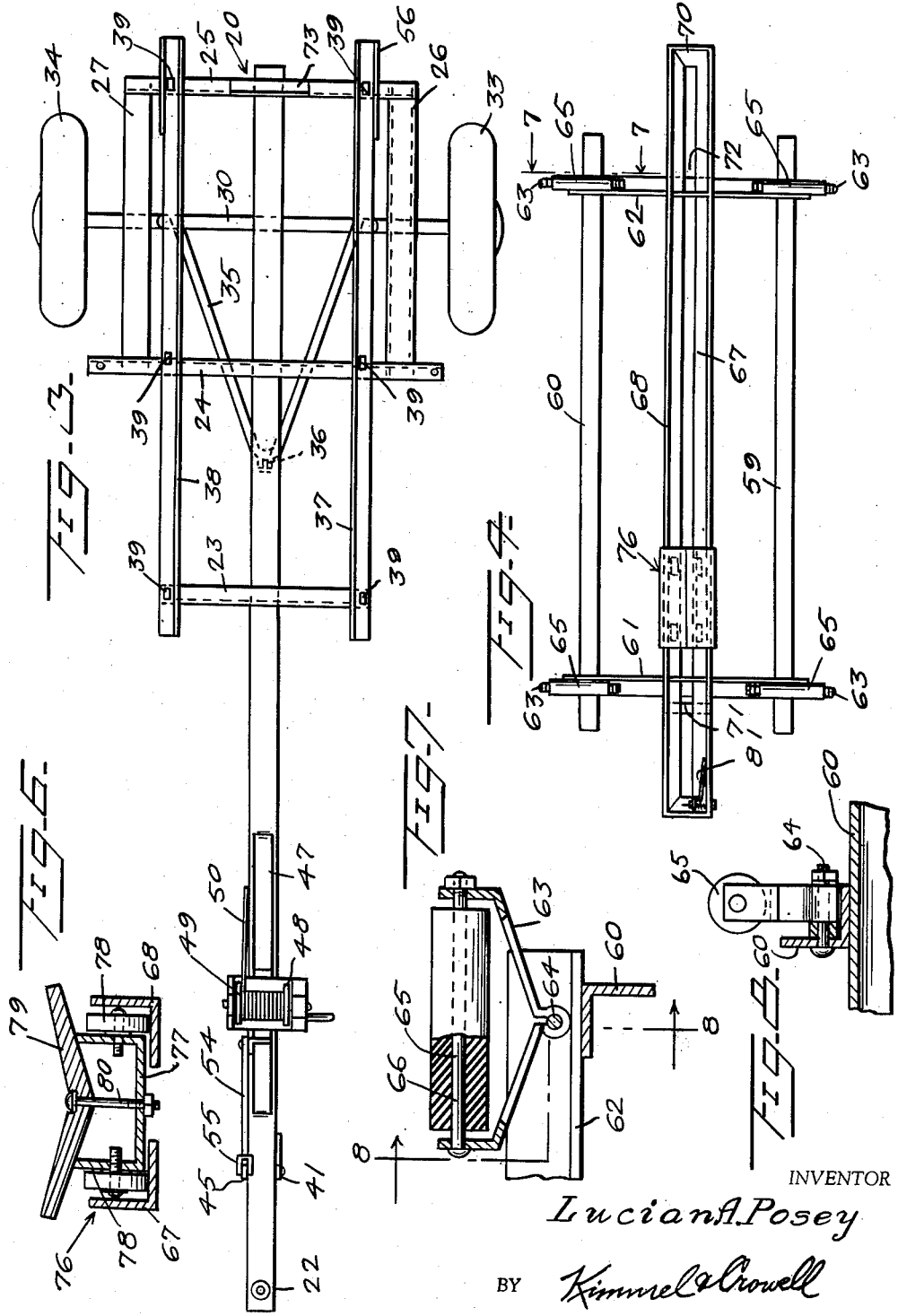
INVENTOR
*Lucian A. Posey*
BY *Kimmel & Crowell*
ATTORNEYS United States Patent Office 2,830,717
Patented Apr. 15, 1958

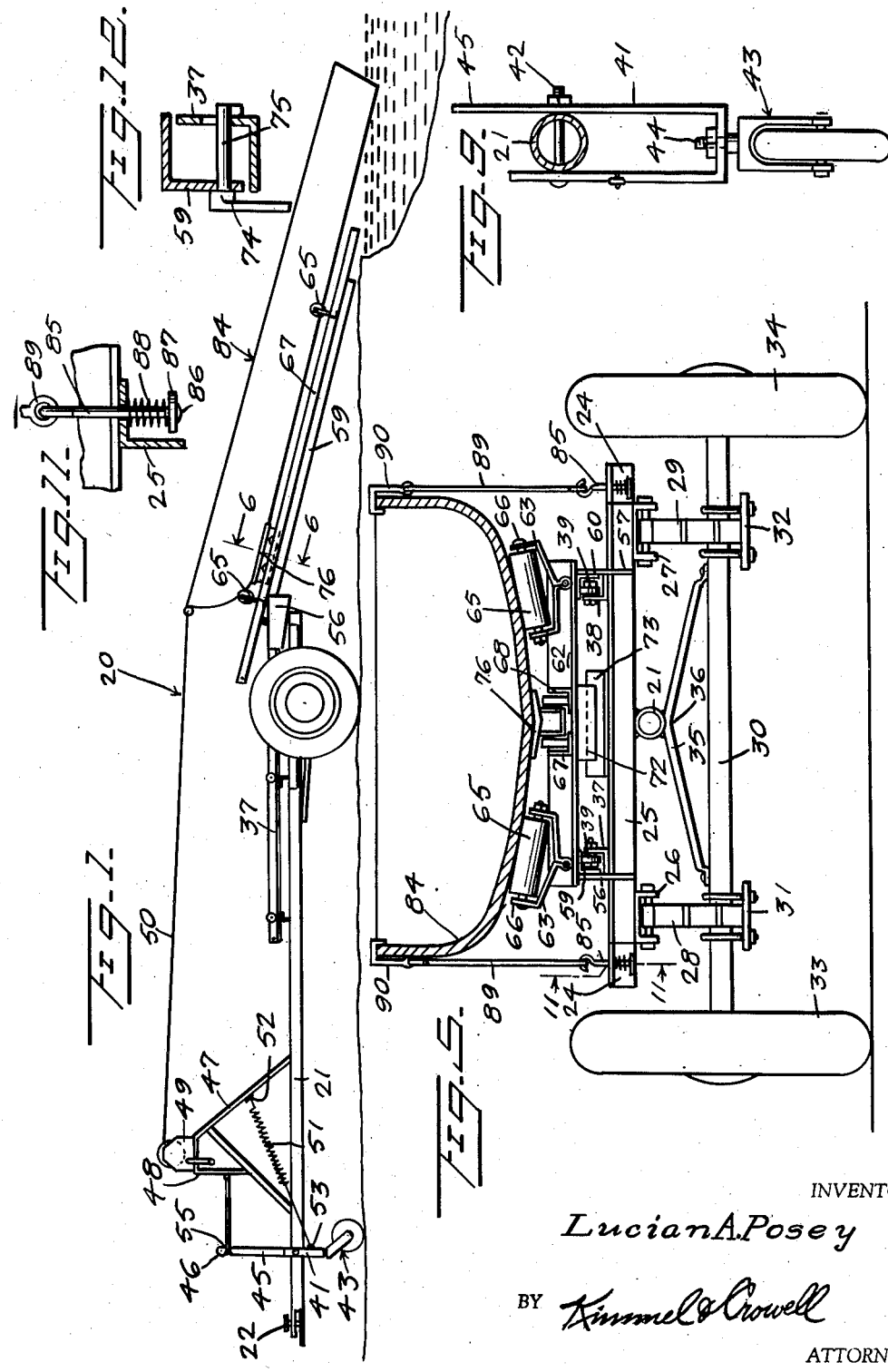

2,830,717
BOAT TRAILER
Lucian A. Posey, Natchitoches, La.
Application March 19, 1956, Serial No. 572,483
5 Claims. (Cl. 214—84)

The present invention relates to boat trailers, and more particularly to such devices incorporating means for launching and recovering the boats.

The primary object of the invention is to provide a boat trailer that is so constructed that one man can launch a boat therefrom into the water and load a boat from the water onto the trailer.

Another object of the invention is to provide a boat trailer that will cradle a boat when in transporting position to prevent injury to the boat.

A further object of the invention is to provide a boat trailer which incorporates means to positively lock the boat in transporting position thereon.

A still further object of the invention is to provide a boat trailer having launching means which are arranged to protect the boat against damage during the launching operation.

Another object of the invention is to provide a cradle, trackway, and supporting carriage for a boat trailer to assist in launching the boat and in placing the boat in position on the trailer.

Another object of the invention is to provide a boat trailer of the class described above which will be inexpensive to manufacture, relatively simple to use, and is sufficiently light of weight to permit ease of towing.

Other objects and advantages will become apparent in the following specification when considered in the light of the attached drawings, in which:

Figure 1 is a side elevation of the invention showing a boat in launching position thereon.

Figure 2A is a partial side elevation similar to Figure 1.

Figure 2B is the rear portion of Figure 2A illustrating the boat cradle in carrying position with one of the trailer wheels removed.

Figure 3 is a top plan view of the invention with the boat cradle removed.

Figure 4 is a top plan view of the boat cradle removed from the trailer.

Figure 5 is an end elevation of the trailer with a boat shown in transverse cross-section positioned thereon.

Figure 6 is an enlarged fragmentary transverse cross-section taken along the line 6—6 of Figure 1, looking in the direction of the arrows.

Figure 7 is an enlarged fragmentary transverse cross-section taken along the line 7—7 of Figure 4, looking in the direction of the arrows.

Figure 8 is a fragmentary vertical cross-section taken along the line 8—8 of Figure 7, looking in the direction of the arrows.

Figure 9 is an enlarged fragmentary transverse cross-section taken along the line 9—9 of Figure 2A, looking in the direction of the arrows.

Figure 10 is an enlarged fragmentary top plan view of the dolly brake shown partly in cross-section for purposes of clarity.

Figure 11 is an enlarged fragmentary vertical cross-section taken along the line 11—11 of Figure 5, looking in the direction of the arrows.

Figure 12 is an enlarged fragmentary transverse cross-section taken along the line 12—12 of Figure 2B, looking in the direction of the arrows.

Figure 13 is an enlarged fragmentary transverse cross-section taken along the line 13—13 of Figure 2B, looking in the direction of the arrows.

Referring now to the drawings in detail wherein like reference numerals indicate like parts throughout the several figures, the reference numeral 20 indicates generally a boat trailer constructed according to the invention. The trailer 20 includes an elongated tubular tongue 21 having a trailer hitch 22 at one end thereof. A plurality of spaced parallel transverse frame members 23, 24 and 25 are secured to the tongue 21 by any suitable means such as welding or the like as best illustrated in Figures 2B and 3. A pair of longitudinally extending parallel inverted channel members 26 and 27 are secured to the frame members 24 and 25 adjacent their outer ends. Leaf springs 28 and 29 are secured at their opposite ends to the channel members 26 and 27 by any conventional means so as to depend therefrom. A transverse axle 30 is positioned in engagement with the springs 28 and 29 and is secured thereto by spring saddles 31 and 32, respectively.

A pair of wheels 33 and 34 are journalled on opposite ends of the axle 30 for engagement with the ground. A V-shaped tie bar 35 has its opposite rear ends secured to the axle 30 and its forward apex secured to the tongue 21 at 36. A pair of longitudinally extending parallel frame members 37 and 38 are positioned above and in contact with the transverse frame members 23, 24 and 25 and are secured thereto by any suitable means such as welding or the like.

A plurality of rollers 39 are mounted for rotation on the frame members 37 and 38 by means of journal bolts 40.

A U-shaped frame 41 is secured to the tongue 21 by means of a pivot bolt 42, as illustrated in Figures 2A and 9. A caster wheel and mount, generally indicated at 43, is secured to the lower end of the U-shaped frame 41 by means of mounting bolt 44. An actuating lever 45 extends integrally from the U-shaped framework 41 a substantial distance above the tongue 21. The forward upper edge of the actuating lever 45 is notched as at 46 for purposes to be described.

A triangular winch mount 47 extends upwardly from the tongue 21 and carries a horizontal winch base 48 adjacent the apex thereof. A hand operated cable winch 49 is mounted on the base 48 as illustrated in Figure 2A. A cable 50 is wound on the winch 49 and is adapted to extend forwardly as shown in Figure 2A to engage the notch 46 in the actuating lever 45, and is adapted to extend rearwardly, for purposes to be assigned, as illustrated in Figure 1. A spring 51 extends between the winch mount 47 and the U-shaped frame 41 being secured at its opposite ends by brackets 52 and 53, respectively. The spring 51 is adapted to normally bias the U-shaped frame 41 to a position with the caster wheel and mount 43 out of engagement with the earth's surface when the hitch 22 is attached to the towing vehicle.

A link 54 is pivoted at one end to the winch base 48 and has an eye 55 integrally formed on its opposite end. The link 54 is adapted to be positioned with the eye 55 in engagement with the notch 46 of the actuating lever 45 to lock the frame 41 in upright position with the caster wheel and mount 43 in engagement with the ground.

A pair of trapezoidal guide plates 56 and 57 are secured to the outer rear portions of the frame members 37 and 38, respectively, for purposes to be described. A cradle, generally indicated at 58, includes a pair of longitudinally extending track members 59 and 60 which are positioned over the frame members 37 and 38, respectively, and engage the rollers 39, as best illustrated in Figure 13. A pair of transverse supports 61 and 62 extend between opposite end portions of the track members 59 and 60 and are secured thereto by welding or the like. A yoke 63 is mounted by means of a pivot 64 to each end of each of the supports 61 and 62, as illustrated in Figure 7.

A resilient roller 65 is mounted in each of the yokes 63 by means of a journal bolt 66. A pair of spaced angle iron track members 67 and 68 are joined at their opposite ends by angle members 69 and 70, respectively. The track members 67 and 68 are secured to the central portion of the support members 61 and 62 by any suitable means such as welding or the like.

A transverse stop 71 is secured in depending relation to the underside of the forward portion of the track members 67 and 68, and a similar stop member 72 is secured to the underside in depending relation to the track members 67 and 68 at the rear thereof. A stop 73 is mounted on and extends upwardly from the frame 25 in position to engage opposite stops 71 and 72 upon movement of the cradle 58 on the frame members 37 and 38.

A lock pin 74 is provided with a keyed shank 75 which is adapted to extend between the track member 59 and a key hole in the frame member 37 thus locking the cradle 58 to the frame 37.

A carriage, generally indicated at 76, consists of a channel framework 77 mounted on a plurality of wheels 78. A V-channel plate 79 is positioned on the upper side of the channel framework 77 and secured thereto by means of a bolt 80 extending therethrough. The carriage 76 is so positioned that the wheels 78 engage the track members 67 and 68 permitting the carriage 76 to move longitudinally thereon. A carriage retainer wedge 81 is secured at one end to the track member 67 and has its opposite end engaged over a guide bolt 82. A coil spring 83 is mounted on the guide bolt 82 in engagement with the retainer wedge 81 to normally bias the wedge 81 into carriage 76 engaging position. A boat 84 is adapted to be supported on the carriage 76 and the roller 65, for purposes to be described.

A pair of eye bolts 85 extend upwardly through opposite ends of the transverse frame member 24 and have a head 86 and washer 87 mounted on their lower ends. Coil springs 88 are positioned about the eye bolt 85 in engagement with the washer 87 and the underside of the frame member 24 to normally bias the eye bolt 85 downwardly with respect to the frame member 24. A flexible strap 89 is attached to the upper end of each of the eye bolts 85 and carry hooks 90 attached to their upper extremities. The hooks 90 are adapted to engage over the gunnels of the boat 84 to detachably secure the boat 84 to the trailer 20 while in transit.

In the use and operation of the invention, beginning with the boat 84 in the water and the cradle 58 in the position shown in Figure 1, the cable 50 is attached to the prow of the boat 84 and the boat is moved so that the forward portion of its keel is brought into engagement with the carriage 76 which is then at the rear of track-way 67, 68 adjacent the angle member 70. The winch 49 is then operated to draw the boat 84 onto the cradle 58 with the carriage 76 moving toward the forward end of the track-way 67 and 68. The boat 84 comes into engagement with the roller 65 and is supported thereby as it moves into carrying position on the cradle 58. The carriage 76 at the forward end of its movement engages the angle member 69 so that the forces exerted by the cable 50 to the boat 84 are transmitted to the carriage 76 and thence to the cradle 58.

The cradle 58 then moves forwardly between the guides 56 and 57 supported by the rollers 39 until the stop 72 comes into engagement with the rear face of the stop 73. Upon reaching this position the lock pin 74 is inserted as described above and the hooks 90 are engaged over the gunnels of the boat 84 to bind the boat 84 to the trailer 20.

In removing the boat 84 from the trailer 20 the carriage 76 and cradle 58 move in reverse order until the stop 71 comes into engagement with the forward face of the stop 73.

The winch 49 is adapted to have its cable 50 engage with the notch 46 in the actuating lever 45 extending upwardly from the U-shaped frame 41 so that the power of the winch 49 can be used to move the U-shaped frame 41 to upright position, as illustrated in Figure 2A, with the caster wheel and mount 43 in engagement with the ground. The link 54 can be used to maintain the frame 41 in erected position so that the cable 50 can be detached therefrom for loading the boat 84.

In transporting the trailer 20 without a boat 84 mounted thereon, the carriage 76 is held in the forward end of the track-way 67 and 68 by the retainer wedge member 81.

Having thus described the preferred embodiment of the invention, it should be understood that numerous modification and structural adaptations may be resorted to without departing from the scope of the appended claims.

What is claimed is:

1. A boat trailer comprising a tongue having means on its end adapted to be connected to a towing vehicle, a frame comprising a transverse beam secured at its mid portion to the tongue, a second transverse beam secured to the tongue at its mid portion and adjacent the end of the tongue, a third beam secured at its mid portion to the tongue and midway of the first named beams, a pair of channel members, one on each side of the tongue and secured to the ends of the last named beams, a pair of longitudinally extending parallel frame members resting on and secured to the transverse beams adjacent the ends of the beams, a plurality of rollers journaled in flanges on each of said longitudinally extending parallel members, a pair of longitudinally extending angle bar track members positioned on and above the longitudinally extending parallel frame members, and resting on the said rollers, a pair of transverse supports connecting the ends of the track members, a yoke mounted midway of each support, said yokes having resilient rollers adapted to be engaged by a boat supported on the trailer.

2. The invention as claimed in claim 1 in which a pin extends through a flange on one of the track members and is adapted to engage a keyhold in a flange of one of said parallel frame members.

3. The invention as claimed in claim 1 in which stops are provided to limit forward movement of a boat upon the trailer.

4. A device as claimed in claim 1 wherein a carriage is mounted for longitudinal movement on said angle bar track members for engagement by a boat during loading and unloading of a boat from said trailer.

5. A device as claimed in claim 4 wherein resilient means are provided at the forward end of said angle bar track members for gripping and securing said carriage at the forward end of its movement therein.

References Cited in the file of this patent

UNITED STATES PATENTS

| | | |
|---|---|---|
| 1,885,399 | Wren | Nov. 1, 1932 |
| 2,389,338 | Zorc | Nov. 20, 1945 |
| 2,558,418 | Brueckman | June 26, 1951 |
| 2,700,480 | Triplett | Jan. 25, 1955 |
| 2,708,045 | Shontz | May 10, 1955 |
| 2,711,259 | Jones | June 21, 1955 |
| 2,763,384 | Foster | Sept. 18, 1956 |

FOREIGN PATENTS

| | | |
|---|---|---|
| 372,172 | Great Britain | May 5, 1932 |